United States Patent [19]

Conroy

[11] Patent Number: 4,731,722
[45] Date of Patent: Mar. 15, 1988

[54] LOW AC HARMONIC DC POWER SUPPLY
[75] Inventor: Ernest F. Conroy, Pittsburgh, Pa.
[73] Assignee: Westinghouse Electric Corp., Pittsburgh, Pa.
[21] Appl. No.: 55,569
[22] Filed: May 29, 1987
[51] Int. Cl.[4] .......................................... H02M 1/12
[52] U.S. Cl. ..................... 363/44; 363/128; 323/207
[58] Field of Search ............... 363/39, 41, 44, 45, 363/46, 47, 48, 84, 127, 128; 323/205, 207

[56] References Cited

U.S. PATENT DOCUMENTS

| | | | |
|---|---|---|---|
| 3,825,814 | 7/1974 | Pelly | 363/39 |
| 4,143,414 | 3/1979 | Brewster et al. | 363/44 |
| 4,245,286 | 1/1981 | Paulkovich et al. | 363/21 |
| 4,314,322 | 2/1982 | Plow et al. | 363/46 |
| 4,395,675 | 7/1983 | Toumani | 323/271 |
| 4,519,022 | 5/1985 | Glennon | 363/41 |
| 4,591,963 | 5/1986 | Retotar | 363/17 |
| 4,651,265 | 3/1987 | Stacy et al. | 363/35 |
| 4,683,529 | 7/1987 | Bucher | 363/44 |

FOREIGN PATENT DOCUMENTS 0198169  11/1983  Japan ................................. 363/44

Primary Examiner—Patrick R. Salce
Assistant Examiner—Judson H. Jones
Attorney, Agent, or Firm—D. Schron

[57] ABSTRACT

A DC power supply which generates little or no harmonics on the supply line includes a bridge circuit having high frequency controlled unilateral switching devices in the four legs thereof and a high frequency filter capacitor connected across two opposed junction points of the bridge to which is also connected a source of input power. The other two opposed junction points of the bridge are connected to a DC loop circuit which in one embodiment maintains a constant current through a load device connected in the loop and in another embodiment maintains a constant voltage. In the constant current embodiment a storage inductor is provided and energy is transferred to and from the storage inductor in accordance with the high frequency switching of the unilateral switch devices. The on and off times of the switch devices are governed by a control circuit which measures the current in the DC loop and compares it with a desired value. In the constant voltage embodiment a DC storage capacitor is provided, across which is connected a load device and the voltage across the capacitor is maintained by a similar control circuit comparing the actual voltage with a desired voltage.

7 Claims, 8 Drawing Figures

4,731,722

LOW AC HARMONIC DC POWER SUPPLY

BACKGROUND OF THE INVENTION

1. Field of the Invention

The invention in general relates to power supplies, and more particularly to a DC power supply which generates minimal or no AC harmonics on the power distribution line to wich it is connected.

2. Description of the Prior Art

An AC power distribution system generally has a variety of different apparatuses connected to it. Distribution system impedances and non-linear apparatus characteristics combine to have a deleterious effect on the quality of the power when it reaches the apparatus.

For example, if an apparatus includes a rectifier arrangement for delivering a DC current (or DC voltage) to a load device, the rectifier arrangement presents a non-linear input current/voltage characteristic and as such, causes a non-linear current flow and a corresponding voltage distortion on the distribution line such that all of the equipment connected to the line is subject to the unwanted distortion.

To remedy this situation, a line voltage conditioner is used which includes an active power filter which corrects for, and substantially eliminates the voltage distortion presented to the rectifier arrangement of the apparatus.

The present invention reduces the equipment requirements in such apparatus by providing for a rectifier arrangement to delivery a DC current (or voltage) to a load device and yet not generate undesirable harmonics on the power line to which it is connected.

SUMMARY OF THE INVENTION

A low AC harmonic, DC power supply is provided which includes a bridge circuit having first and second as well as third and fourth opposed junction points and including high frequency power switching means in the form of controlled unilateral switches in each of the four legs of the bridge circuit. A high frequency filter capacitor is connected to the first and second opposed junction points to which is additionally connected a source of AC input power. A DC loop is connected to the third and fourth opposed junction points with the DC loop including an energy storage device in the form of an inductor for a constant current embodiment or a capacitor for a constant voltage embodiment. The DC loop includes output terminals for connection to a DC load and control means are provided and is responsive to a predetermined parameter of the DC loop and is operable to control the high frequency switching of the controlled unilateral switches to maintain the desired parameter at a relatively constant value when a DC load is connected to the output terminals.

DESCRIPTION OF THE PREFERRED EMBODIMENTS

Figure 1:
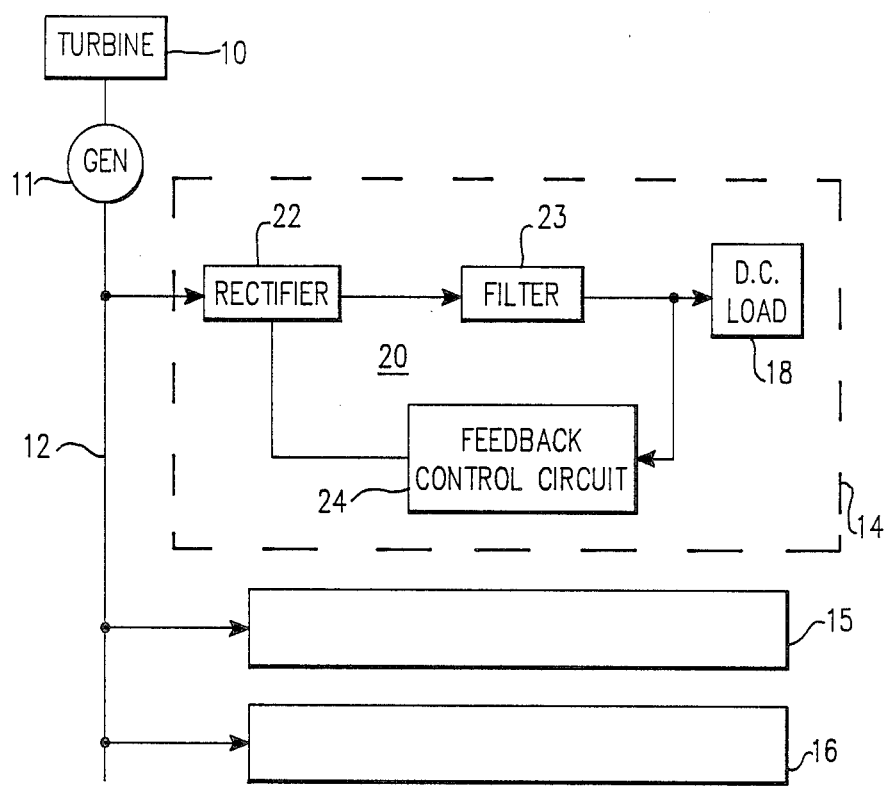
FIG. 1 shows a typical power distribution arrangement including an apparatus which has a non-linear input.

Referring now to FIG. 1, there is illustrated a typical power distribution system which includes a prime mover in the form of a turbine 10 which drives an electrical generator 11 to provide power to a distribution network 12. Numerals 14, 15 and 16 represent different pieces of equipment connected to the distribution network and which include a DC load such as depicted in apparatus 14. Interposed between the DC load 18 and the AC power distribution network 12 is a rectifier arrangement 20, typically including an active rectifier section 22, a filter 23, and a feedback control circuit 24 connected to the output of filter 23 and operable to control the active rectifier section 22 so as to maintain a relatively constant DC current (or voltage) input to DC load device 18.

The rectifier arrangement 20 presents a non-linear input characteristic and as such, non-linear load current is caused to flow through the distribution network thereby providing a distorted AC input to other pieces of equipment connected to the network.

Figure 2:
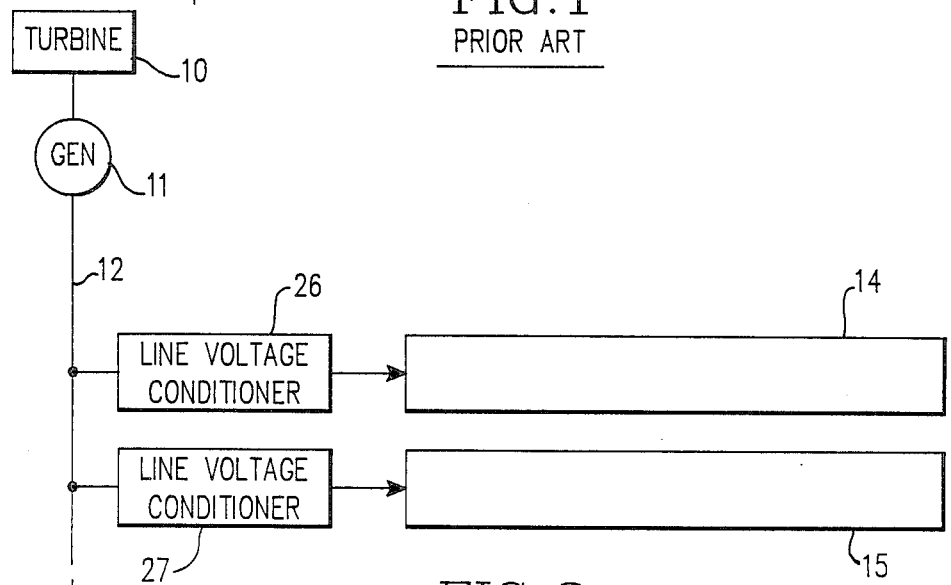
FIG. 2 is a system as in FIG. 1, illustrating the possible placement of line conditioning circuitry for preventing distortion.
Figure 3:
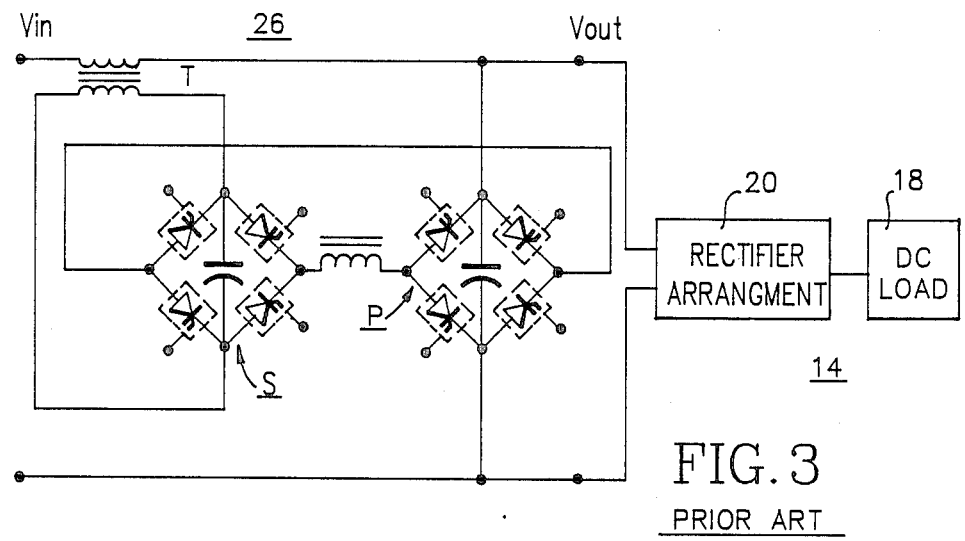
FIG. 3 is a view of a typical line voltage conditioner.

To obviate this unwanted distortion, active filters or line voltage conditioners are generally utilized. FIG. 2 illustrates two line voltage conditioners 26 and 27 connected by way of example between the power distribution network 12 and the input to equipment 14 and 15, more particularly to the rectifier arrangements thereof. FIG. 3 illustrates a typical line voltage conditioner 26 positioned at the input of equipment 14.

The line voltage conditioner includes parallel and series-connected full wave bridge configurations P and S each including unidirectional, solid-state power switching devices, the on and off times of which are governed by a control circuit (not illustrated). An inductor $L_{DC}$ is connected between the series and parallel bridge arrangements S and P to complete a DC loop wherein the inductor $L_{DC}$ acts as a source of stored energy and wherein loop current is maintained by appropriately controlling the modulating signals applied to the power switching devices of the parallel bridge configuration P. Very basically, power required by the series arrangement will be obtained from the parallel arrangement and power generated by the series arrangement will be returned to the AC output $V_{Out}$ by the parallel element. The series arrangement S in conjunction with capacitor C1 acts as a voltage regulator and by proper modulation of the power switching devices of the bridge configuration S, in conjunction with transformer T the line voltage may be increased or decreased such that $V_{Out}$ can be regulated at any required level above or below the AC input $V_{In}$.

The parallel bridge configuration P in conjunction with capacitor C2 operates as an active filter and with the proper modulation of the power switching devices thereof a bypass path is provided for equipment generated ripple currents so as to maintain a purely sinusoidal waveform at $V_{Out}$ even in the presence of the non-linear characteristics of the rectifier arrangement 20. A line voltage conditions either with an inductive storage device or a capacitive storage device is more fully described and claimed in U.S. Pat. No. 4,651,265 (Ser. No. 760,030, filed July 29, 1985) and hereby incorporated by reference.

The present invention utilizes some of the principles involved in the line voltage conditioner for supplying a load such as DC load 18 with a constant current (or voltage) with a significant reduction in the circuitry required, particularly the elimination of a rectifier arrangement such as 20, and does so with minimal or no generation of AC harmonics on the input line. One embodiment of the present invention for maintaining a constant current through a load device is illustrated in FIG. 4.

Figure 4:
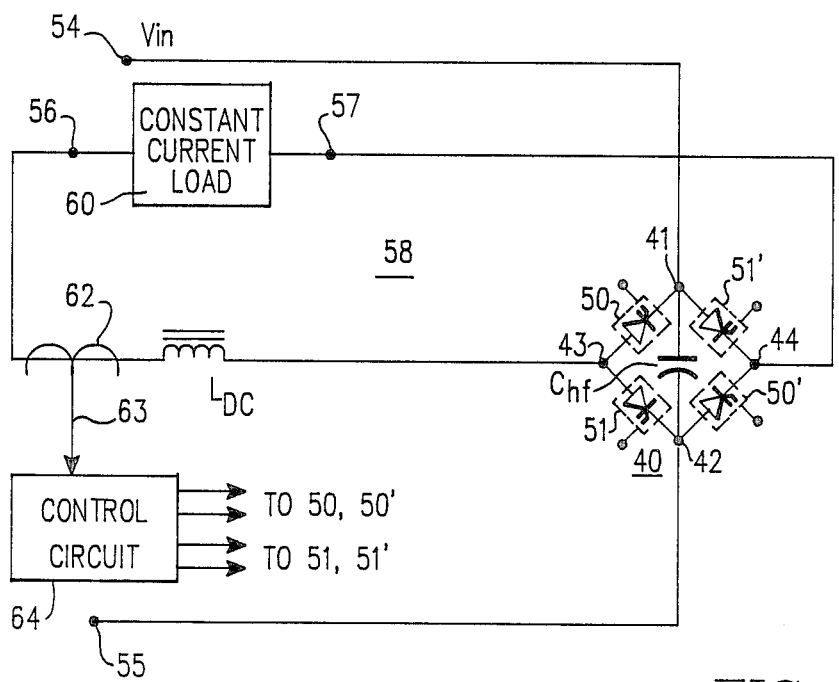
FIG. 4 is a schematic presentation of one embodiment of the present invention.

The DC power supply of FIG. 4 includes a bridge circuit 40 having first and second opposed junction points 41 and 42 as well as third and fourth opposed junction points 43 and 44. Each of the legs of the bridge circuit includes a controlled power switching device as in the line voltage conditioner of FIG. 3 and designated by the reference characters 50 and 50' constituting one pair and 51 and 51' constituting a second pair, and operable such that when one pair of switching devices is conducting the other pair is non-conducting and vice versa.

A source of AC power is connected to junction points 41 and 42 by application of an input voltage $V_{In}$ at input terminals 54, 55. Junction points 43 and 44 are connected to respective output terminals 56 and 57 all part of a DC loop 58 which includes a source of stored energy in the form of inductor $L_{DC}$, and a constant current load 60 connected to output terminals 56 and 57. A current sensor 62 is positioned to obtain an indication of the DC current in the loop 58 and to provide a corresponding output signal on line 63 to control circuit 64 the output of which governs the firing of the power switching devices in the bridge circuit 40. As will be described, the switching is accomplished at a relatively high frequency and a capacitor $C_{hf}$ connected to junction points 41 and 42 functions as a high-frequency filter to smooth out load current.

During operation, when $V_{In}$ is positive and switching device pair 50 and 50' are on and switching device pair 51 and 51' are off, capacitor $C_{hf}$ gets charged up in a positive direction. Although no current is inserted into the loop by virtue of the input signal, current in the DC loop is maintained by the stored current in $L_{DC}$ which traverses the current path through switching device 50, through capacitor $C_{hf}$, switching device 50', through constant current load 60 and back to inductor $L_{DC}$ such that the DC current in the loop 58 tends to decrease. When the high frequency switching signal is such as to turn on switching devices 51 and 51' and turn off switching devices 50 and 50', current flow from input terminal 54 is through switching device 51' through constant current load 60, through inductor $L_{DC}$, through the other on switching device 51 and out through terminal 55. The previously stored charge on capacitor $C_{hf}$ also is provided to the DC current loop 58. During this mode of operation, energy is added to the DC loop 58 tending to increase the current thereof.

In a similar manner, on the negative half cycle of $V_{In}$ when switching devices 51 and 51' are on, capacitor $C_{hf}$ gets charged up in a negative direction and when switching devices 50 and 50' are on current from terminal 55 as well as the previously stored charge on capacitor $C_{hf}$ is provided to the DC current loop 58.

Figure 5:
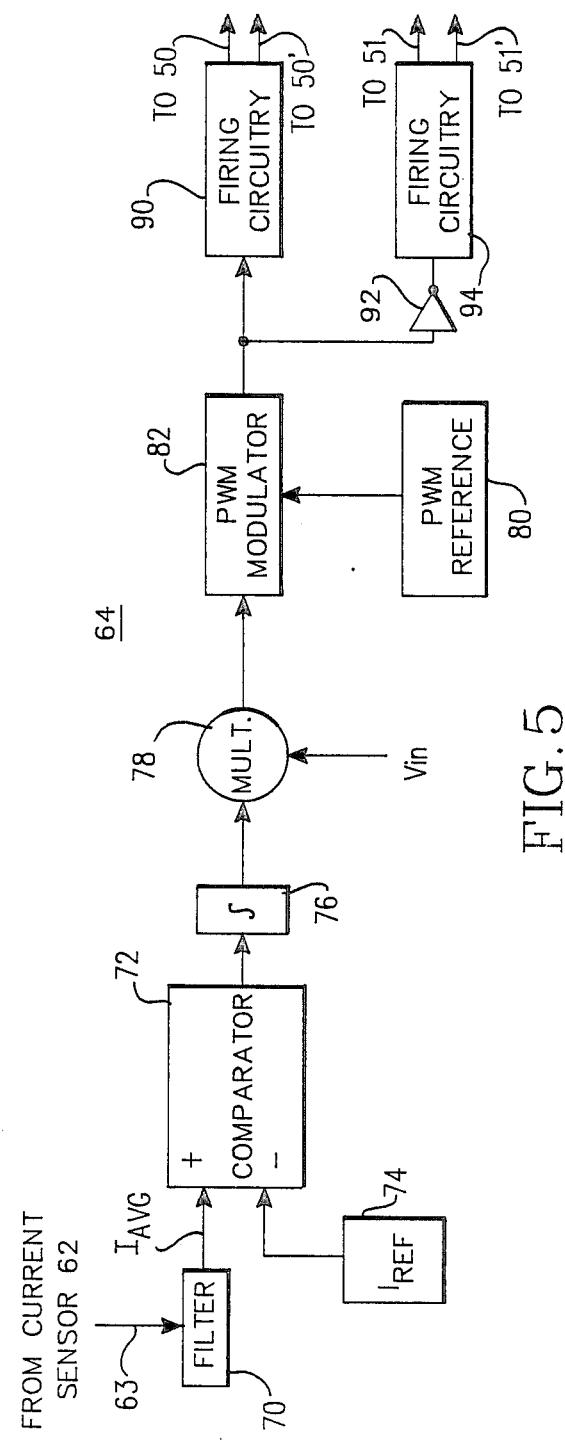
FIG. 5 is a block diagram of a control system for controlling the power switching devices of FIG. 4.

Thus with equal on and off duty times of the switching device pairs 50, 50' and 51, 51' and assuming no losses, for each on cycle of one pair of switching devices current will be removed from the DC loop 58 and for the on time of the other switching devices current will be added to the DC loop 58. By carefully controlling the high frequency switching times of the power switching devices therefore, the current in the DC loop through the constant current load 60 may be held to a predetermined value even in the presence of normal losses within the load 60 as well as within the power switching devices and inductor. The operation of maintaining a substantially constant current in the DC loop may best be explained with additional reference to FIG. 5 which shows one type of control circuit which may be utilized for controlling the duty cycles of the power switching devices.

An indication of the actual current in the DC loop is obtained by current sensor 62 and since the current may actually vary slightly about an average value, a filter 70 is provided and, in response to the sensor output signal, is operable to provide an indication of the actual average value of the current in the DC loop 58. This value is compared, in a comparator 72 with a reference current derived from an adjustable reference source 74. If the actual current deviates from the reference current, comparator 72 will provide an output signal indicative of the difference, this signal being accumulated by integrator 76 to constitute an error signal. This error signal is multiplied by the AC voltage $V_{In}$ in multiplier 78 the output signal of which constitutes an AC current error signal.

Figure 5A:
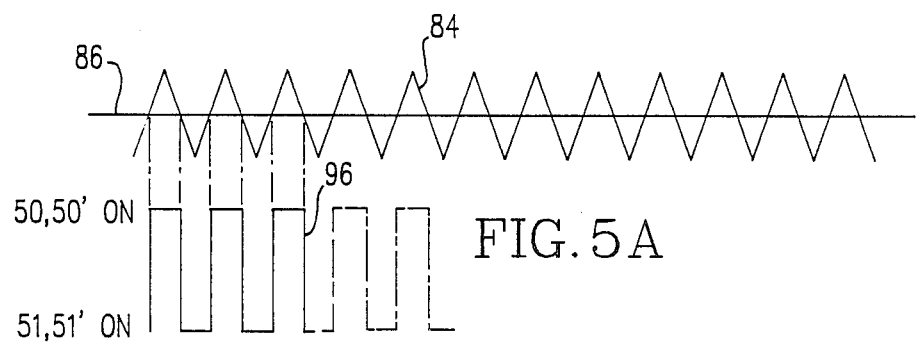
FIGS. 5A and 5B are waveforms to aid in the understanding of the operation of the present invention.

A pulse-width modulation (PWM) reference generator 80 is operable to provide a high frequency triangular waveform to PWM modulator 82 to derive the duty cycles of the power switching device pairs. The PWM reference waveform is a high frequency signal typically in the kilohertz region for example 80 Khz, as opposed to the AC source frequency which may, for example, be 60 or 400 hertz. By way of example in FIG. 5A, numeral 84 represents the triangular waveform generated by the reference 80 as applied to PWM modulator 82. Let it be assumed that there is no AC current error signal, this condition being represented by horizontal line 86. In such situation every time waveform 84 rises above the level of 86 a positive output signal will be provided to firing circuit 90 to turn on power switching devices 50 and 50'. Concurrently, inverter 92 ensures that firing circuit 94 maintains switching devices 51 and 51' in an off condition. Conversely, when waveform 84 falls below the level of 86 the negative condition of the output of PWM modulator 82 in conjunction with inverter 92 and firing circuit 94 will function to turn on the switching device pair 51 and 51' while firing circuit 90 maintains switching devices 50 and 50' in an off condition. This situation is represented by waveform 96 in FIG. 5A.

Figure 5B:
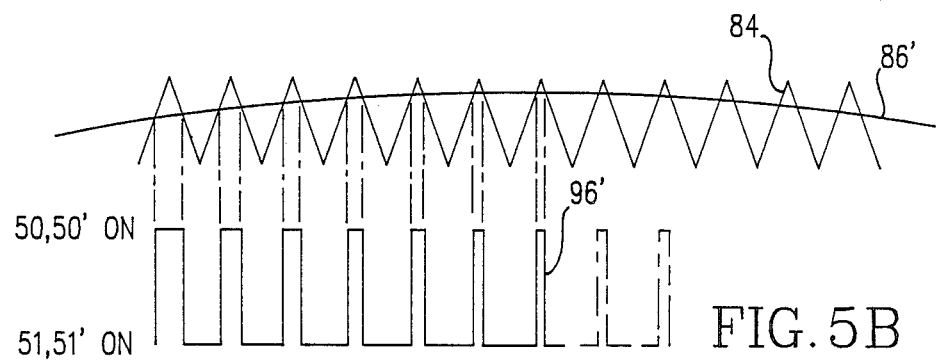

In actual operation there will be some losses in the circuit and in addition, it is possible that the resistance of load 60 may change. Let it be assumed that due to various causes the actual current in the DC loop 58 falls below the desired reference value. In such instance there will be generated an accumulated error signal which when multiplied by the $V_{In}$ reference will result in an AC current error signal, such signal being represented by waveform 86' in FIG. 5B. In such instance the on and off times of the power switching devices will not be equal as was the case with respect to FIG. 5A but will have respective duty cycles as shown by waveform 96' in 5B.

The effect of the unequal on/off times will tend to increase the current in the DC loop 58 to bring it back to its desired value. The on times of switching devices 51 and 51' are maximum when waveform 86' attains a maximum value and are equal to the on times of switching devices 50 and 50' when waveform 86 is midway between its maximum positive and maximum negative value.

If for some reason the actual current in the DC loop increases above its desired value then an AC current error signal will be generated such that the on times of switching devices 50 and 50' will be proportionally greater than the on times of the other switching device 51 and 51'. Control of switches 50, 50' and 51, 51' in this manner results, with filtering provided by $C_{HF}$, in a near sinusoidal current provided by source $V_{In}$ to the DC power supply. Low order harmonic currents generated by typical rectifier arrangements are not present and distortion of voltage $V_{In}$ is not a problem.

Figure 6:
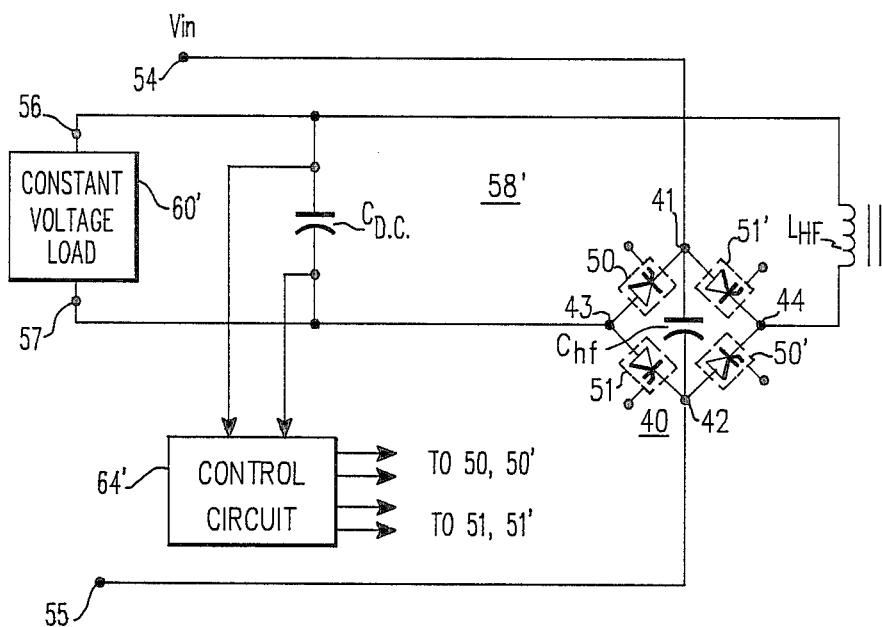
FIG. 6 illustrates another embodiment of the present invention.

FIG. 6 illustrates another embodiment of the present invention wherein a constant voltage is maintained in the DC loop 58' as opposed to the constant current embodiment of FIG. 4. The DC loop 58' connected to terminals 43 and 44 of bridge circuit 40 include a capacitor $C_{DC}$ for providing a constant voltage at output terminals 56, 57 to a constant voltage load 60'. The DC loop includes an inductor $L_{HF}$ inserted in order to limit the rate of rise of current in the loop. The voltage across capacitor $C_{DC}$ is sensed and provided to a control circuit 64' which would compare the actual voltage with the desired voltage and in a manner similar to the operation described with respect to FIG. 5 would govern the on and off times of power switching devices 50, 50' and 51, 51' to properly transfer input power to the capacitor $C_{DC}$ so as to maintain a substantially constant voltage thereacross.

I claim:

1. A low AC harmonic, DC power supply comprising:
  (A) a bridge circuit having first and second opposed junction points and third and fourth opposed junction points and including high frequency power switching means in each of four legs thereof;
  (B) a high frequency filter capacitor connected to said first and second opposed junction points;
  (C) a source of AC power connected across said first and second opposed junction points;
  (D) a DC loop connected to said third and fourth opposed junction points;
  (E) said DC loop including an energy storage device;
  (F) said DC loop including output terminals for connection to a DC load; and
  (G) a control circuit responsive to a predetermined parameter of said DC loop and operable to control the high frequency switching of said power switching means to maintain said parameter at a relatively constant value when said DC load is connected to said output terminals.

2. Apparatus according to claim 1 wherein:
  (A) said energy storage device is an inductor having one end connected to one of said output terminals and another end connected to one of said third or fourth opposed junction points.

3. Apparatus according to claim 2 wherein:
  (A) said parameter maintained at a relatively constant value is a DC current.

4. Apparatus according to claim 1 wherein:
  (A) said energy storage device is a capacitor having one end connected to one of said output terminals and another end connected to another of said output terminals.

5. Apparatus according to claim 4 wherein:
  (A) said parameter maintained at a relatively constant value is a DC voltage.

6. Apparatus according to claim 5 which includes:
  (A) an inductor in said DC loop, of an inductance value to limit the rate of rise of current in said DC loop.

7. Apparatus according to claim 1 wherein:
  (A) the frequency of switching of said high frequency power switching means is at least 200 times greater than the frequency of said AC power source.

* * * * *